Dec. 22, 1925.

R. H. MADSEN

LAWN MOWER SHARPENER

Filed Sept. 24, 1924     3 Sheets-Sheet 1

1,566,614

Witness:
W. H. Hall

Inventor:
Rasmus H. Madsen
By Hazard and Miller
Attorneys.

Dec. 22, 1925.  
R. H. MADSEN  
LAWN MOWER SHARPENER  
Filed Sept. 24, 1924   3 Sheets-Sheet 2
1,566,614
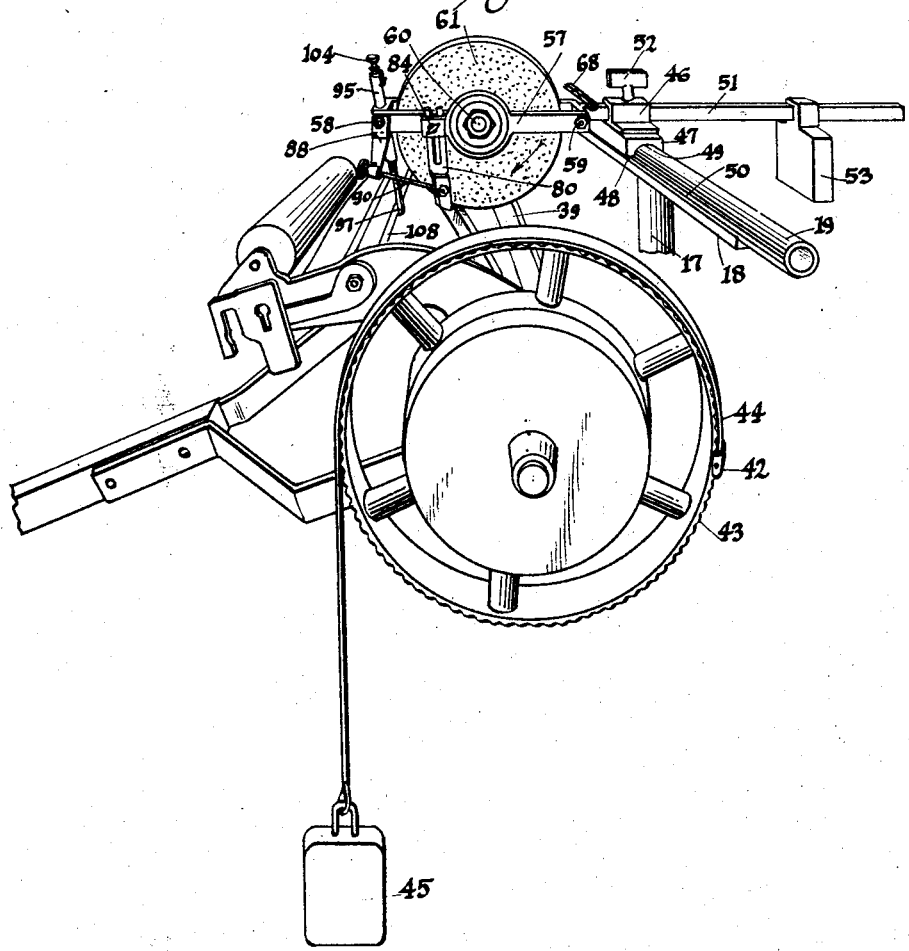
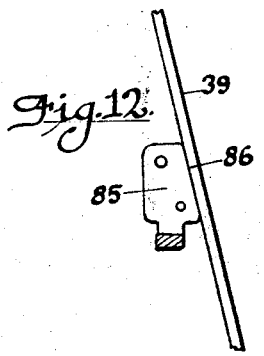
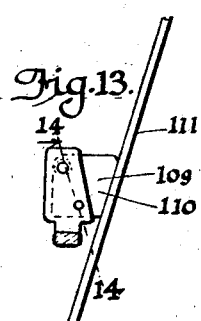
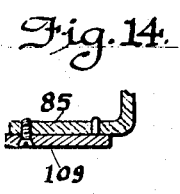

Dec. 22, 1925.                                                                                       1,566,614
                         R. H. MADSEN
                    LAWN MOWER SHARPENER
              Filed Sept. 24, 1924           3 Sheets-Sheet 3
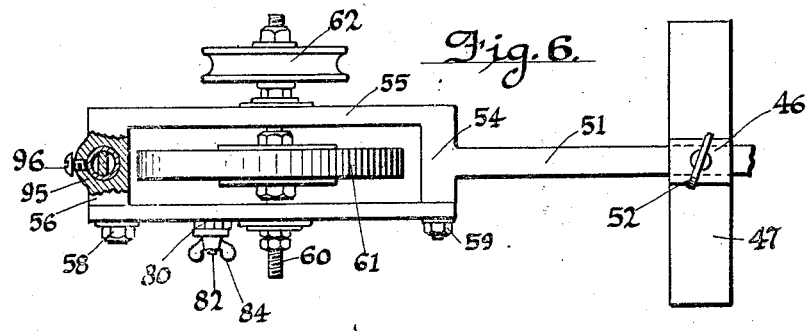
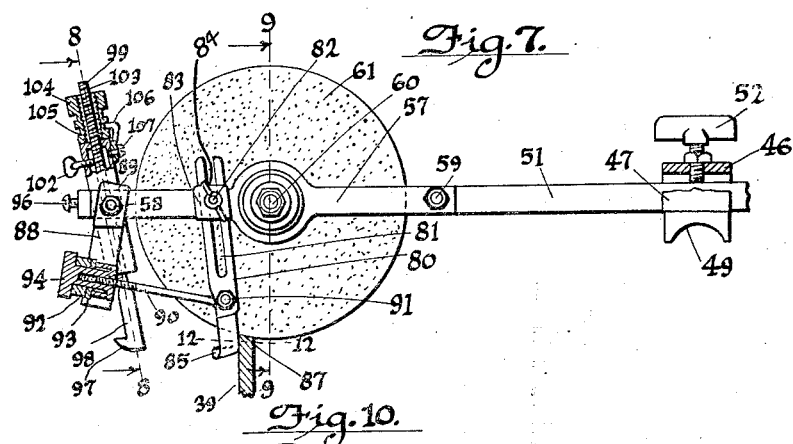
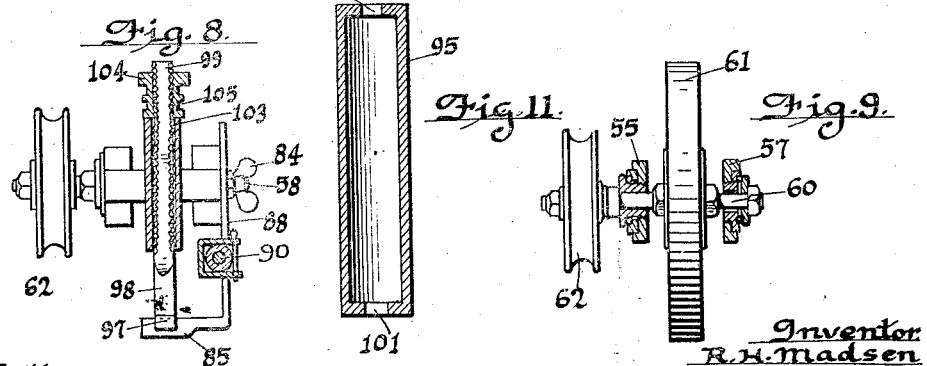

Patented Dec. 22, 1925.

1,566,614

UNITED STATES PATENT OFFICE.

RASMUS H. MADSEN, OF HOLLYWOOD, CALIFORNIA.

LAWN-MOWER SHARPENER.

Application filed September 24, 1924. Serial No. 739,590.

*To all whom it may concern:*

Be it known that I, RASMUS H. MADSEN, a citizen of the United States, residing at Hollywood, in the county of Los Angeles and State of California, have invented new and useful Improvements in Lawn-Mower Sharpeners, of which the following is a specification.

This invention is a lawn mower sharpener and consists of the novel features herein shown, described and claimed.

My present invention is a modification of and an improvement upon the invention shown, described and claimed in my companion application for lawn mower sharpeners filed Feb. 15, 1923, Serial No. 619,101.

The principal object of these inventions is to provide a power driven grinder suitably mounted for easily and quickly sharpening the blades of the rotating cutting wheels of lawn mowers.

Other and more specific objects will appear from the drawings and specification.

The drawings illustrate the construction and operation of the present form of a lawn mower sharpener embodying the principles of my invention.

Fig. 5 is an enlarged fragmentary perspective looking in the direction indicated by the arrow 5 in Fig. 2.

Fig. 6 is a top plan view of the grinding wheel and the mounting for the grinding wheel as seen looking in the direction indicated by the arrow 6 in Fig. 7 and as seen looking downwardly in Figs. 1 and 5.

Fig. 7 is a side elevation as indicated by the arrow 7 in Fig. 6, parts being broken away and shown in section.

Fig. 8 is a sectional detail on the line 8—8 of Fig. 7.

Fig. 9 is a sectional detail on the line 9—9 of Fig. 7.

Fig. 10 is an end view of the housing shown in Figs. 7 and 8 and as seen looking in the direction indicated by the arrow 10 in Fig. 11.

Fig. 11 is a section on the line 11—11 of Fig. 10.

Fig. 12 is a fragmentary sectional detail on the line 12—12 of Fig. 7 and looking downwardly as indicated by the arrows.

Fig. 13 is a view analogous to Fig. 12 and showing a secondary guide shoe for a left hand cutting blade, whereas Fig. 12 shows a right hand cutting blade.

Fig. 14 is a sectional detail on the line 14—14 of Fig. 13.

Figure 1:
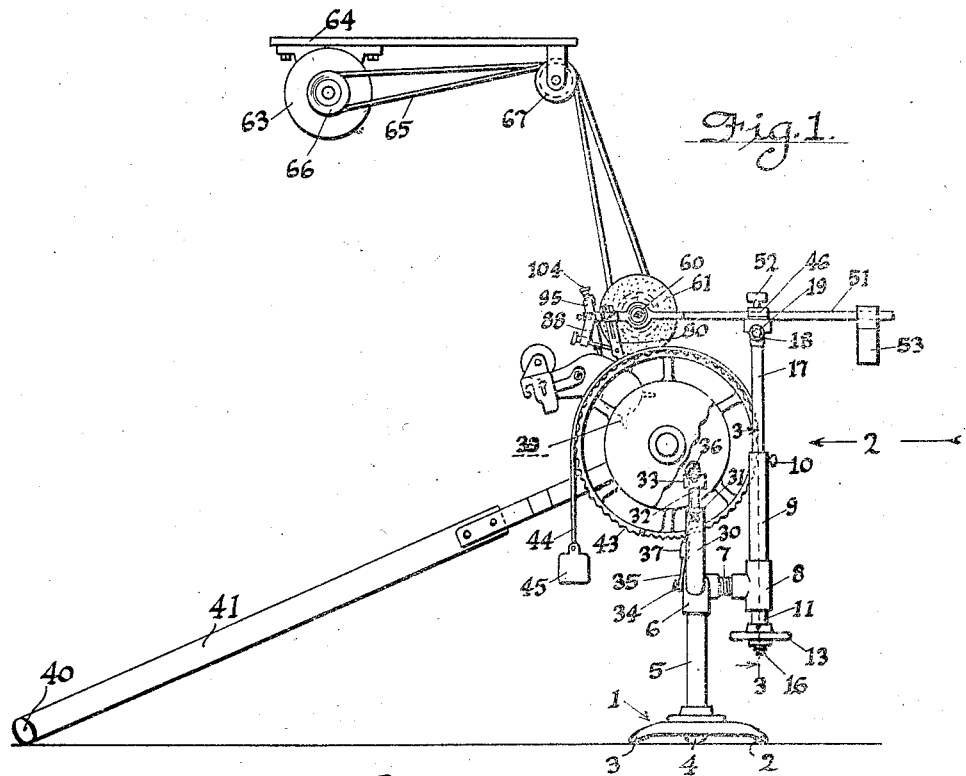
Figure 1 is a side elevation of the lawn mower sharpener with a lawn mower in position to be sharpened, the view being taken looking in the direction indicated by the arrow 1 in Fig. 2.

The details of construction and operation shown in the drawings are as follows:

The base 1 has bearing points or feet 2, 3 and 4 for engagement with a floor or the ground. A post 5 extends upwardly from the center of the base 1. A fitting 6 is fixed upon the upper end of the post 5. A nipple 7 extends backwardly from the fitting 6. A T 8 is fixed upon the nipple 7. A pipe section 9 extends upwardly from the T 8 and has a set screw 10 at its upper end. A pipe section 11 extends downwardly from the T 8 and has a flange 12 upon its lower end. A hand wheel 13 has a hub 14 fitting upon the flange and pipe section 11 and held in place by a set screw 15. The pipe section 11 extends only a part way through the hub 14 and the remaining part of the hub is screw threaded to form a nut portion 16. A supporting stem 17 is inserted downwardly through the pipe sections 9 and 11 and the nut portion 16 screwed upon the lower end of the stem so that by manipulating the hand wheel 13 the stem 17 may be adjusted up and down and held in its adjusted position and against rotation by the set screw 10.

A cross head 18 is fixed to the upper end of the stem 17, said cross head being substantially half round in cross section. A pipe is mounted in the concavity of the cross head 18 and secured in place to form a track 19, said track being curved or half round in cross section and straight longitudinally.

Arms 20 and 21 extend from the fitting 6 in a direction crosswise of the nipple 7. A T 22 is mounted upon the outer end of the arm 20. A nipple 23 extends upwardly from the T. A pin 24 is slidingly mounted in the nipple. A concaved supporting head 25 is formed integral with the pin 24. A bushing 26 is screwed into the lower end of the T 22. An adjusting screw 27 is screwed through the bushing 26 to engage and support the pin 24 and has a hand wheel 28 upon its lower end and a lock nut 29 engaging the bushing so that by manipulating the hand wheel 28 the supporting head 25 may be raised or lowered and held in an adjusted position. A bearing 30 is formed by bending the arm 21 upwardly and a set screw 31 is mounted through one side of the bearing. A pin 32 slides up and down in the bearing 30 and is held in adjusted position by the set screw 31.

A concaved head 33 is formed integral with the pin 32 and matches the head 25. A pin 34 is fixed in the fitting 6 and extends forwardly. A hook 35 engages the pin 34. A second hook 36 is connected to the hook 35 by a turn buckle 37. In mounting the lawn mower in position for sharpening, the bar 38 is placed in the concavities of the heads 25 and 33, the turn buckle hooks 35 and 36 are placed in position with the hook 36 engaging the bar 38, and the hand wheel 28 is manipulated to level the heads 25 and 33 and the turn buckle 37 manipulated to draw the parts tight as required to hold the lawn mower blades 39 with their edges in planes parallel with the track 19.

In mounting the lawn mower for sharpening, the lawn mower is turned bottom upward and the handles 40 rest upon the floor or ground and the tongue 41 serves as a brace to hold the machine upright during the sharpening operation.

A clip 42 is adapted to grip one of the wheels 43 of the lawn mower. A cord 44 extends from the clip upwardly over the wheel and downwardly and a weight 45 is attached to the lower end of the cord, the force of the weight 45 being exerted to rotate the wheel 44 enough to cause the blade to bear against the support during the grinding operation.

A box-shaped bearing 46 is fixed to a base 47 and the lower face of the base 47 is concaved to fit the track 19 so that the base will slide freely upon the track. A square bar 51 is adapted to slide through the box-shaped bearing 46 and be held in adjusted position by a set screw 52. A counter-balancing weight 53 is slidingly mounted upon the rear end of the bar 51. A cross head 54 is formed at the forward end of the bar 51. A side bar 55 extends from one end of the cross head 54. A second cross head 56 extends from the side bar 55 parallel with the cross head 54. A side bar 57 is mounted parallel with the side bar 55 against the opposite ends of the cross heads 54 and 56 and secured in place by nuts 58 and 59.

Figures 2, 3, 4:
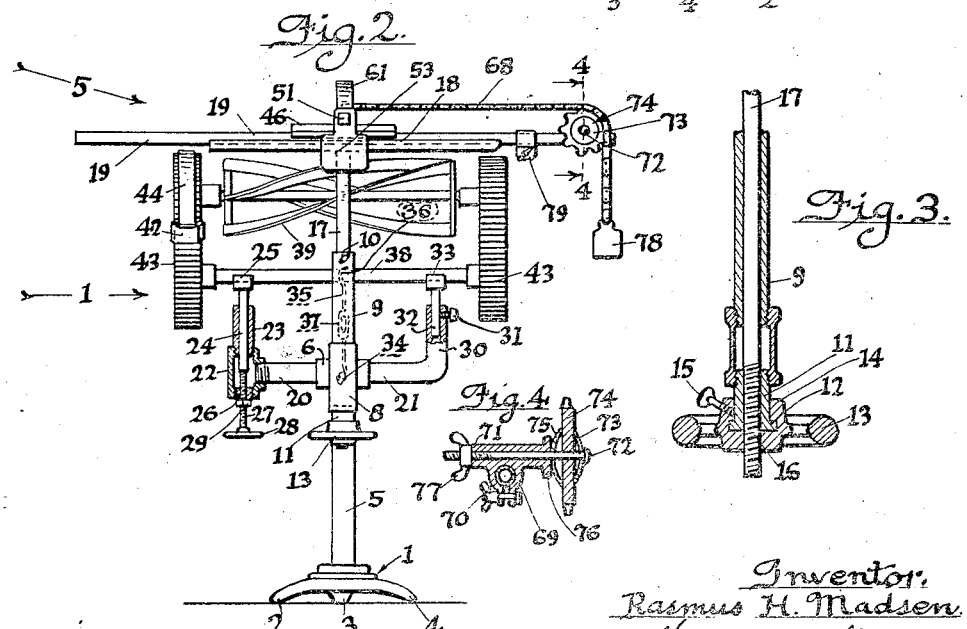
Fig. 2 is a rear elevation as seen looking in the direction indicated by the arrow 2 in Fig. 1, parts being broken away and shown in section.
Fig. 3 is an enlarged sectional detail upon the line 3—3 of Fig. 1.
Fig. 4 is an enlarged sectional detail on the line 4—4 of Fig. 2.

The grinding wheel spindle 60 is mounted in bearings through the side bars 55 and 57 and the grinding wheel 61 is mounted upon the spindle 60 between the side bars 55 and 57. A grooved belt wheel 62 is fixed upon the end of the spindle 60 outside of the side bar 55. A motor 63 may be mounted against the ceiling 64 some distance in front of the sharpener and a round belt 65 runs from the motor pulley 66 over the guide pulleys 67 and downwardly over the belt wheel 62. The guide pulleys 67 should be centrally located relative to the travel of the grinder from one end of a blade to the other so that the belt may move either way as required to drive the traveling grinder. A sprocket chain 68 is connected to the bar 51 and extends laterally to the left when seen from the front or to the right as seen in Fig. 2 from the rear. A split bearing 69 fits upon the track 19 and is clamped rigidly upon the track by a bolt and nut 70. A bearing sleeve 71 is formed integral with the bearing 69 and crosswise thereof. A bolt 72 is inserted through a spring washer 73, through a sprocket wheel 74, through a second spring washer 75, and through the sleeve bearing 71. The spring washer 75 engages the head 76 upon the sleeve 71 and the head of the bolt engages the spring washer 73. A nut 77 is mounted upon the opposite end of the bolt 72 from the head and the sprocket wheel 74 is normally loosely mounted upon the bolt 72. When the nut 77 is manipulated and tightened upon the bolt, the spring washers 73 and 75 form a friction brake mechanism. The chain 68 extends over the sprocket wheel 74 and downwardly and a weight 78 is attached to the lower end of the chain 68, the force of the weight being exerted to pull the grinding wheel 61 and the carriage gradually from one end to the other of the blade 39 being ground. A stop collar 79 is adjustably mounted upon the track 19 to limit the movement of the grinding wheel under the influence of the weight 78.

A guide bar 80 fits against the outer face of the side bar 57 and has a long slot 81. A bolt 82 extends outwardly from the side bar 57 through the slot 81. A clamping plate 83 fits against the outer face of the guide bar and the clamping nut 84 upon the bolt 82 engages the plate 83 to hold the guide bar 80 in an adjusted position. The guide bar 80 extends downwardly beyond the periphery of the grinding wheel 61 and has a foot 85 extending horizontally with an inclined bearing face 86 against which the blade 39 being drawn bears.

It is desirable to produce a beveled face 87 upon the edge of the blade and the adjustment of the guide bar 80 relative to the periphery of the grinding wheel 61 determines this beveled face. A brace 88 has a bearing portion 89 fitting against the side bar 57 and offset under the side bar and the bolt carrying the nut 58 is inserted through the bearing portion 89 and the nut applied to hold the brace rigidly in place. A brace 90 is pivotally connected near the lower end of the guide bar 80 by a bolt 91. A bearing 92 is carried by the brace 88. A nut 93 is mounted in the bearing 92 and has a head 94 engaging the bearing and the nut is adjustably screwed upon the brace 90 so that by manipulating the head 94 the guide bar 80 may be swung forwardly or backwardly to regulate the angle at which the blade 39 will be ground.

A housing 95 is slidingly mounted through the cross head 56, the housing being slightly inclined with its upper end forwardly of its lower end, and the housing is held adjustably in position by a set screw 96. A hook 97 is formed upon the lower end of a bar 98 and the bar 98 is formed integral with a flat shank 99 inserted upwardly through elongated openings 100 and 101 in the head of the housing 95. The housing is circular in cross section and the shank 99 is flattened or formed flat so as to be non-rotatably mounted through the openings 100 and 101. A set screw 102 is mounted through the housing to engage the shank 99 and the upper end of the shank is screw threaded by cutting threads 103 in its edges the same as though it was round. An adjusting nut 104 is mounted upon the screw threaded upper end of the shank 99 against the top of the housing 95. The periphery of the nut 104 has an annular groove 105, and an L-shaped keeper 106 is secured to the housing 95 by a cap screw 107 with the point of the keeper in the groove 105 so as to hold the nut 104 against the head of the housing 95. The hook 97 engages under the straight rigid cutter 108 and must be accurately adjusted so as to slide freely along this cutter during the grinding operation. The hook 97 serves to hold the grinding wheel and grinding wheel carriage against the edge 87 and to resist the strain of the belt which would tend to lift the grinder away from the blade 39.

In most lawn mowers the cutting blades upon the rotating wheel are spiral sections made right handed or clockwise, and these blades will fit against the foot 85 as shown in Fig. 12. However, some lawn mowers are made with left handed or anti-clockwise spirals and in order to grind such a lawn mower a secondary foot 109 is bolted against the bottom of the primary foot 85 and has an oppositely inclined face 110 against which the left handed blade 111 will bear in grinding.

In the practical operation the lawn mower is turned bottom upward and placed in the concavities of the heads 25 and 33 and the heads 25 and 33 adjusted to a level and to bring the blades 39 into proper position to be engaged by the grinding wheel 61. Then the guide arm 80 is adjusted with reference to the grinding wheel 61 and the blade 39, the hook 97 is applied to the rigid blade 108 and properly adjusted, the grinding wheel and carriage moved to the left hand side when seen from the rear as in Fig. 2, and the motor started. The vibration of the grinding wheel and other parts will assist the weight 79 in moving the grinding wheel carriage to the right until the base 47 engages the stop 79. Then the carriage is manually moved to the other end, a new blade is brought into position against the guide arm 80, and the operation repeated, and so on until all the blades have been ground.

Various changes may be made without departing from the spirit of the invention as claimed.

I claim:

1. In a lawn mower sharpener, an adjustable grinding wheel support comprising a base, a post extending upwardly from the center of the base, said post having means for supporting a lawn mower positioned for the blades to be ground, a fitting upon the upper end of the post, a nipple extending backwardly from the fitting, a T having its side opening fitting the nipple, a pipe section extending upwardly from one end of the T, a set screw in the pipe section, a second pipe section extending downwardly from the T, a hand wheel rotatably mounted upon the second pipe section, the pipe section extending part way through the hub of the wheel and the remaining part of the hub forming a screw threaded nut, a stem inserted downwardly through the two pipe sections and screw seated in the nut, and a track fixed horizontally upon the upper end of the stem.

2. In a lawn mower sharpener an adjustable lawn mower support comprising, a base, a post extending upwardly from the base, said post having means to support a grinder guiding track, arms extending laterally from the upper end of the post in opposite directions, a bearing extending upwardly from one arm, a pin slidingly mounted in the bearing, a set screw mounted in the bearing to engage the pin, a concaved head upon the upper end of the pin, a bearing extending upwardly from the outer end of the other arm, a pin slidingly mounted in the bearing, a second concaved head upon the upper end of the pin, and an adjusting screw mounted to shove the pin up and down to level the second relative to the first head.

3. In a lawn mower sharpener an adjustable grinding wheel support comprising, a base, a post extending upwardly from the base said post having means for supporting a lawn mower positioned for the blades to be ground, a support extending backwardly from the upper end of the post, a housing vertically mounted at the back end of the support, a stem slidingly mounted in the housing, means for adjusting the stem up and down, and a track fixed horizontally upon the upper end of the stem.

4. In a lawn mower sharpener a lawn mower support comprising, a base, a post extending upwardly from the base said post having means to support a grinder guiding track, arms extending horizontally in opposite directions from the upper end of the post, vertical bearings at the outer ends of the arms, pins adjustably mounted in the bearings, supporting heads at the upper ends of the pins, and means for adjusting the pins up and down and to a level with each other.

5. In a lawn mower sharpener a stand comprising, a base, a post extending upwardly from the base said post having means for supporting a lawn mower positioned for the blades to be ground, a support extending backwardly from the upper end of the post, a housing vertically mounted at the back end of the support, a stem slidingly mounted in the housing, means for adjusting the stem up and down, a track fixed horizontally upon the upper end of the stem, arms extending horizontally in opposite directions from the upper end of the post, vertical bearings at the outer ends of the arms, pins adjustably mounted in the bearings, supporting heads at the upper ends of the pins, and means for adjusting the pins up and down and to a level with each other.

6. In a lawn mower sharpener, an adjustable support for a lawn mower, an adjustable track connected to the support, a base slidingly mounted upon the track, a bearing crosswise of the base, a bar slidingly mounted through the bearing, a set screw for holding the bar in adjusted position, a counterweight upon the rear end of the bar, a grinding wheel frame extending forwardly from the bar, a grinding wheel in the grinding wheel frame, a split bearing mounted upon one end of the track, a bearing sleeve crosswise of the split bearing, a bolt extending through the bearing sleeve, spring washers upon the bolt, one of the washers being against the end of the bearing sleeve, a sprocket wheel upon the bolt between the washers, a nut upon the bolt for adjusting the tension of the spring washers, a chain connected to the bar and extending over the sprocket wheel, and a weight upon the lower outer end of the chain.

7. In a lawn mower sharpener, a grinding wheel frame, a grinding wheel in the grinding wheel frame, a guide bar adjustably connected to the grinding wheel frame and extending downwardly beyond the periphery of the grinding wheel and adapted to be engaged by a blade, a brace rigidly connected to the grinding wheel frame, a bearing carried by the brace, a nut mounted in the bearing, and a second brace connected to the guide bar and screw seated in the nut.

8. In a lawn mower sharpener, a grinding wheel frame, a grinding wheel in the grinding wheel frame, a guide bar adjustably connected to the grinding wheel frame and extending downwardly beyond the periphery of the grinding wheel and adapted to be engaged by a blade, a brace rigidly connected to the grinding wheel frame, a bearing carried by the brace, a nut mounted in the bearing, a second brace connected to the guide bar and screw seated in the nut, a housing adjustably mounted through the grinding wheel frame, a hook, a shank extending from the hook non-rotatably through the housing, the upper end of the shank being screw threaded above the housing, a nut upon the screw threaded end of the shank against the housing, and means for holding the nut against the housing, the hook being adapted to engage the rigid cutter of the lawn mower.

In testimony whereof I have signed my name to this specification.

RASMUS H. MADSEN.